United States Patent [19]

Keller

[11] 4,201,338
[45] May 6, 1980

[54] MOLD IDENTIFICATION

[75] Inventor: René Keller, Wettswil, Switzerland

[73] Assignee: Emhart Zurich S. A., Zurich, Switzerland

[21] Appl. No.: 908,605

[22] Filed: May 23, 1978

Related U.S. Application Data

[63] Continuation-in-part of Ser. No. 805,244, Jun. 9, 1977, abandoned.

[30] Foreign Application Priority Data

Jun. 14, 1976 [CH] Switzerland ............... 7512/76
May 25, 1977 [CH] Switzerland ............... 6424/77

[51] Int. Cl.² ............... G01N 21/16; G01D 21/04; G06K 7/10
[52] U.S. Cl. ............... 235/454; 250/223 B; 356/240
[58] Field of Search ............... 209/111.5, 111.7 R, 209/111.7 T; 250/223 B, 568; 356/196, 198, 240; 111/DIG. 5; 235/454, 462, 464, 466, 473, 494, 455; 340/146.3 F

[56] References Cited

U.S. PATENT DOCUMENTS

| | | | |
|---|---|---|---|
| 3,409,760 | 11/1968 | Hamisch | 235/494 |
| 3,627,991 | 12/1971 | Beall | 235/454 |
| 3,745,314 | 7/1973 | Mathias | 209/72 |
| 3,745,354 | 7/1973 | Vargo | 235/466 |
| 3,786,238 | 1/1974 | Heisner | 235/473 |
| 3,896,294 | 7/1975 | Schisselbauer | 235/454 |
| 3,923,158 | 12/1975 | Fornaa | 209/111.7 T |
| 3,963,918 | 6/1976 | Jensen | 356/196 |
| 3,991,883 | 11/1976 | Hobler | 250/223 B |
| 4,020,327 | 4/1977 | Geary | 235/454 |
| 4,088,265 | 5/1978 | Garczynski | 235/454 |

Primary Examiner—Robert M. Kilgore
Attorney, Agent, or Firm—H. Samuel Kieser

[57] ABSTRACT

The identification of a mold in which a vessel made from an optically transparent material has been molded. The vessel is provided with a plurality of marks disposed about a path on the wall of the vessel. There is a first set of marks disposed above the path and a second set disposed below the path. One of the first or second sets contains code marks for providing an indication of the mold and the other set contains timing marks suitable for the sequential reading of the code marks. The marks are illuminated by a light path as the vessel is moved and the diffraction or reflection of the light caused by the marks is evaluated. Time impulses are generated in response to the evaluation of the timing marks for sequential reading of the code marks.

14 Claims, 12 Drawing Figures

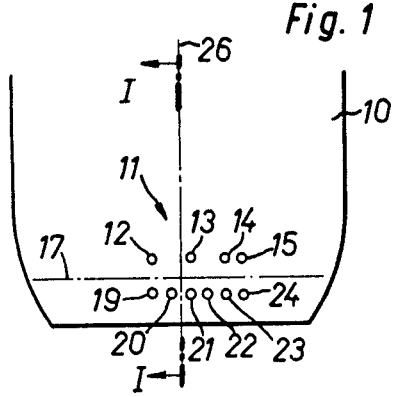
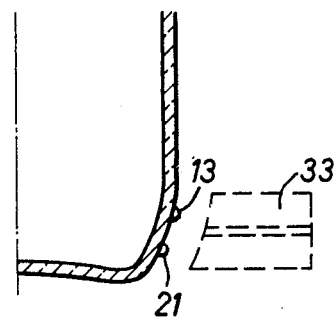
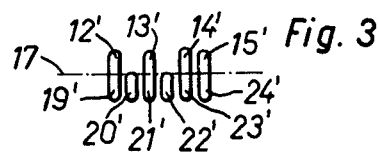
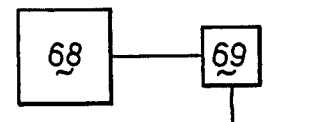
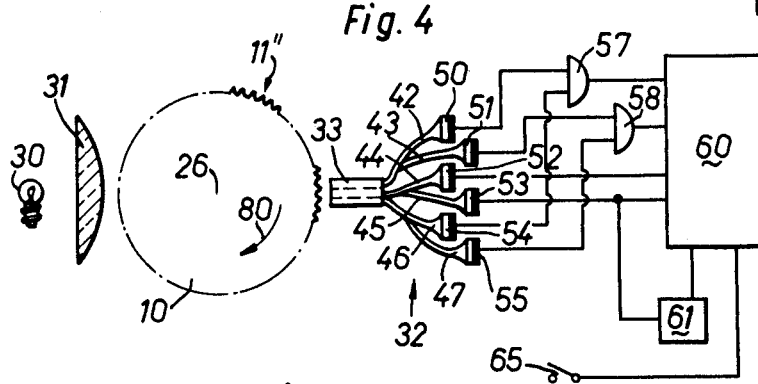
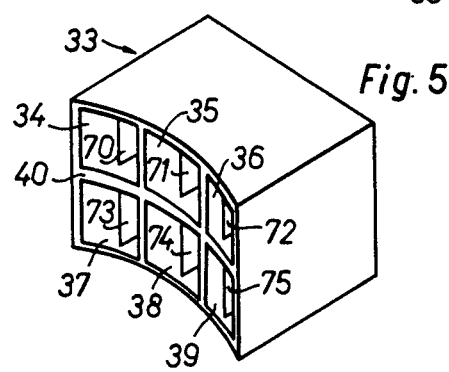
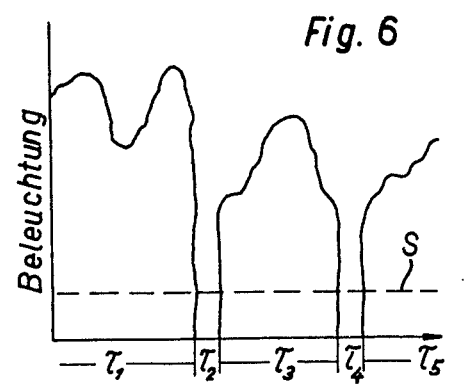

MOLD IDENTIFICATION

RELATED CASES

This application is a continuation-in-part of copending application Ser. No. 805,244, filed June 9, 1977, now abandoned.

BACKGROUND OF THE INVENTION

The present invention relates to the identification of the mold in which a vessel made from an optically transparent material has been molded. The mold in which the vessels are molded has an individual marking suitable for imprinting onto the vessel comprising relief-like elements disposed on a circular path.

In the manufacture of an article in a press mold, casting mold or blow mold, the deficiencies and errors of the mold are transferred onto the article. The result is, especially in manufacturing installations equipped with a number of identical molds and possessing a high production rate, that two important problems arise: the identification of that mold in which a specific article suffering from a defect was molded and the sorting out of all the articles which have been made in this mold, before the defective article was recognized or in the period between recognition of the defective article and replacement of the corresponding mold. The solution of these problems is especially important in modern installations for the production of glass vessels. The molds utilized in such installations are subjected to exacting thermal conditions and high mechanical loads and exhibit a correspondingly high rate of wear. Furthermore, such installations are equipped with a number of identical molds and are operated at a high production rate. Since it is only possible for the vessels to be examined for possible errors after they have passed through a tempering furnace, a large number of vessels have usually been molded in a defective mold, before the defect is discovered.

In order to solve both problems, the molds are furnished with a marking, which is transferred onto every article molded in them. This marking may simply be an ordinal number. A known device for reading the ordinal number designating the mold on a glass vessel is described in French patent application No. 74 21259 (AB Platmanufaktur). This device is adapted for reading ordinal numbers which are represented in a digital code. The individual code elements are constituted as dash-shaped, relief-like projections, which are disposed along a peripheral circle and preferably on the bottom surface of the vessel. To read them, at least one part of the peripheral circle is illuminated. The relief-like projections of the code elements then cause both the light passing through the vessel wall and also the light reflected from the vessel wall to be diffracted more intensely than that from a plane vessel wall. To read the code, the illuminated vessel is rotated about the center of the circle in front of a stationary reading device, and the changes in illumination of the reading device caused by the code elements are converted into electrical signals. In order to distinguish the illumination changes produced by the code elements from those which, for example, are caused by other markings formed on the vessel wall by mold joints or irregularities in the vessel wall, the evaluating device connected to the reading device is controlled by a synchronizing generator. For the synchronizing generator, a signal generator may be used, which generates synchronizing impulses which are proportional to the rotational speed of the drive apparatus for the vessel.

A preferred use of this device in the sorting line of an installation for manufacturing glass vessels is described in U.S. Pat. No. 3,923,158 (AB Platmanufaktur). In this use, the output from the device and the output from at least one test device of the sorting line are connected to associated inputs of a recording device. As soon as one of the test devices detects an unacceptable fault or an inadmissable number of faults, the ordinal number molded on the defective vessel and simultaneously or previously read by the reading device is indicated by the recording device and is stored or printed out optionally as desired.

The above-described device possesses a number of disadvantages, which severly restrict its practical use.

The evaluating circuit can only evaluate the read signals correctly when the code elements to be read pass before the reading device synchronously with the synchronizing impulses. For this to occur, two conditions must be satisfied. Firstly, the rotational speed of the vessels must coincide exactly with the rotational speed of the drive mechanism which triggers the signal generator, that is to say the vessel must not be subject to any slip relative to the drive device. This requirement cannot in practice be fulfilled with the high throughput speeds and rotational speeds encountered in the measuring and testing stations of a modern sorting line. Secondly, the angular interval between the code elements on the peripheral circle of the vessel must stand in an exactly defined relationship to the angular intervals between the markings utilized for triggering the signal generator and situated on the drive device. This requirement can only be satisfied in new molds. On account of the exacting thermal conditions and mechanical loading of the molds already mentioned, these molds are subject to unavoidable wear and small changes in shape, which adversely affect the angular interval between the code elements. Independently of the quality of the mold, changes in angle between the code elements can also be caused by uneven expansion and contraction of the vessel during tempering.

In the device described, the relief-like molded code elements are utilized as optical lenses, which image the light source upon the photoelement of the reading device. This necessitates a relatively high degree of accuracy in the shape of each code element, which cannot however be guaranteed on account of the wear of the molds already referred to.

Furthermore, in this device, the reading device is illuminated with practically parallel light, so long as there is no code element in the light path between the source and the reading device. This basic illumination is dependent upon the color of the glass of the vessel and the thickness of its wall, and the reading device accordingly produces a variable base signal, upon which the signal generated by a code element is superimposed. The absolute value of the two signals is therefore dependent not only upon the illumination of the reading device by a code element, but also upon the fluctuations in the base signal. The absence of a constant reference signal, against which the read signals can be set in a comparative relationship, renders the evaluation of the signals difficult and can indeed make this evaluation impossible.

SUMMARY OF INVENTION

The present invention has for its object an improved identification of the mold in which a vessel, manufactured from optically transparent material, is molded.

Another object of the present invention is to overcome the disadvantages described above.

In accordance with one aspect of the invention, the vessel is provided with a plurality of marks disposed about a path on the wall of the vessel. There is a first set of marks disposed above the path and a second set disposed below the path. One of the first or second sets contains code marks for providing an indication of the mold, and the other set contains timing marks suitable for the sequential reading of the code marks.

According to another aspect of the invention, the method of identifying the mold in which the vessel having the markings described above was molded includes rotating the vessel about the center axis of the path, illuminating the marks by a light path as the vessel is rotated and evaluating the diffraction of light caused by the marks, and generating time impulses in response to the evaluation of the timing marks for sequential reading of the code marks.

The present invention also contemplates an apparatus for identifying the mold in which the vessel, described above, was molded. The apparatus includes means for rotating the vessel about the center axis of the path, means for generating a light beam orientated substantially perpendicular to that portion of the vessel wall which is furnished with the marks as the vessel is rotated, and reading means disposed opposite to said means for generating a light beam, said reading means including means for reading said code marks and means for reading said timing marks, and means for converting the change in illumination caused by the presence of a mark into an electrical signal.

With this new method, it is ensured that the code elements or marks pass in front of the reading device synchronously with the synchronizing impulses, independently of what rotational speed the vessel may possess relative to the drive device, because the marking contains code elements and timing marks. This synchronizing is not adversely affected by the aging of the mold or by irregular contraction of the glass during tempering, because any possible change in the distance between successive code elements is compensated by an equal change of the distance between the associated timing marks.

According to a preferred embodiment, a reading device is used, for the evaluation of the diffraction of the light caused by the elements or marks of the marking, which is so disposed and constructed that, in the absence of an element or of a mark in the light path it is illuminated and, when an element or a mark passes through the light path it is darkened.

The use of this new reading device makes it possible for the signals read to be compared with a constant reference voltage and thus for the signals read to be separated with minimal complication and optimal reliability from the output signal generated by the reading device.

DESCRIPTION OF THE DRAWINGS

The invention is now described with the assistance of Figures in relation to a preferred example of embodiment. The Figures show:

FIG. 1 a lateral view of the lower part of a glass vessel with one form of embodiment of the new marking;

FIG. 2 a partial section along I—I through the lower part of the vessel of FIG. 1;

FIG. 3 another embodiment of the new marking;

FIG. 4 a diagrammatic plan on the preferred device for carrying out the method of this invention and the block diagram for the reading device and the electronic evaluation device;

FIG. 5 a perspective view of a form of embodiment of the light stop block incorporated in front of the reading device;

FIG. 6 a diagrammatic representation of the illumination of a photodiode before and during the passage of a marking;

DETAILED DESCRIPTION

Figure 7:
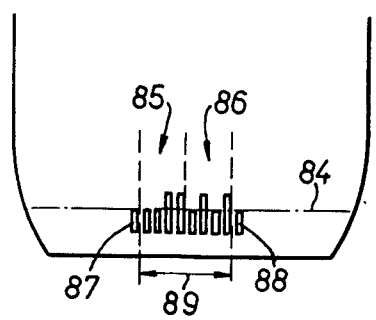
FIG. 7 a preferred form of embodiment of the new marking.

FIG. 1 shows the lower part of a glass vessel 10, the bottom turned-in part of which possesses a marking 11. The individual marks are disposed in two horizontal rows, the first row of which, comprising marks 12-15, is disposed above a circular path 17 and the second row, comprising marks 19-24, below this circular path. The marks project from the wall of the glass vessel as shown in FIG. 2 and are oval in plan and have a circular arc cross-section in the horizontal direction. The marks are disposed in the bottom turned-in part of the vessel, that is set back from the maximum vessel diameter, which prevents the marks from being damaged when vessels are in contact with each other. On account of their shape, the marks act like optical lenses, diffracting the light passing through them.

The example of a marking shown in FIG. 1 contains, in the row below the circular path 17, the four marks 20 to 23, which are used as timing marks. These marks are provided for producing the synchronizing impulses, which regulate the reading device and evaluating device yet to be described. The marking also comprises, above the circular path and especially vertically above the timing marks, only two marks 13, 14, used as code elements. The indicated position of the two marks 13, 14 used as code elements, relative to the timing marks 20 to 23 corresponds to the number 5 in the BCD code (0, 1, 0, 1). Finally, in the marking shown, a further pair of marks 19, 12 and 24, 15 is provided to the right and left of the timing marks, one mark of each pair being below and one above the circular path 17. Each of these pairs of marks is provided for generating a starting signal, which activates the synchronizing generator, reading device and evaluating device. The two pairs of marks are disposed on the two sides of the true marking, so that the starting signal is produced before the timing marks and code elements enter the reading device, independently of the rotational direction of the vessel.

The marking illustrated as an example enables the numerals 1 to 10 to be represented in BCD code. In order to increase the range of numerals and for example to constitute the numbers 0 to 99, it is possible simply to arrange two tetrads one after the other. This would mean in practice that, instead of the four timing marks shown, eight such marks would need to be used with one field for a code element associated with each timing mark. It will be understood that in the same way it is also possible for three or more tetrads to be utilized for representing still larger numerals.

Instead of the marks shown, which are oval in plan, it is of course also possible for marks which are circular in plan to be used. Because the marks are used as optical lenses and are more effective the larger their cross-section, the marks are preferably formed as dash-shaped marks, which act as cylindrical lenses. FIG. 3 shows a marking comprising such dash-marks, the dash-marks corresponding to the marks shown in FIG. 1 being referenced with the same symbol plus an apostrophe. With this marking system, marks of the lower and upper row situated vertically one above another are simply joined together to a single dash-mark of double the length.

FIG. 4 shows diagrammatically a plan view of a preferred embodiment of an apparatus for carrying out the new method and also the block diagram for the reading device and the electronic evaluating device. The apparatus cooperates with a rotational device, not shown, which is disposed in the path of a sorting line and in which a vessel 10 is rotated at least once about its vertical axis of symmetry 26. Rotational devices of this type are known to every person skilled in the art and described, for example, in Swiss Pat. Nos. 548,599 and 570,912. An illuminating device is disposed on one side of the rotational device and comprises a light source 30 and a condenser lens 31, which generates a practically parallel light beam. A light stop block 33 is mounted on the other side. The light stop block contains six channels 34 to 39 (FIG. 5). These channels extend practically in the same direction as the light beam produced by the illumination device 30, 31. The cross-section of each channel is approximately equal to the cross-section, situated in the same direction, of an individual mark of the marking. The six channels are disposed in two superimposed rows, each of which contains three channels. The end of each channel nearest the light source is open. The entry end of a photoconductor 42 to 47 is introduced into the opposite end of the channels. The photoconductors preferably consist of a fibre optic. The outlet end of each photoconductor is connected to an associated photodiode 50 to 55. The signal outputs of the photodiodes 50 and 54, which are connected by the photoconductors 42 and 46 respectively to the channels 34 and 36 respectively, lead to a gate circuit 57, the output of which is connected to the input of the memory store 60. The signal outputs from the photodiodes 51 and 55, which are connected via the photoconductors 43 and 47 respectively to the channels 37 and 39 respectively, also lead to a gate circuit 58, which is connected to a further input of the store 60. The signal output of the photodiode 52, which is connected via the photoconductor 44 with the channel 35 and is used for reading the marks provided as code elements, is connected directly with the store 60, and the signal output of the photodiode 53, which is connected via the photoconductor 45 with the channel 38 and is used for reading the marks provided as synchronizing generators, is likewise directly connected to the store 60 and in addition to the input of a counter 61. The output of this counter is also connected to the store 60. From the output of the store, a line 62 leads to one input of a comparator 63.

The rotational device, not shown here, for the vessel 10 contains a switch 65, which is actuated when a vessel enters the rotating device. This switch is connected via a line 66 with the store 60.

In addition, one or more data input devices 68 are provided. Each data input device contains a sensing field, by means of which at least one number can be sensed. The output of each data input device is connected with the input of a multiplexer 69, the output of which is connected to the other input of the comparator 63.

FIG. 5 shows, in perspective, a light stop block 33. This block comprises six channels 34 to 39, which are disposed in two superimposed rows each of three channels 34, 35, 36 and 37, 38, 39. The cross-section of each channel is slightly larger than the cross-section of a mark, for example the mark 20' in FIG. 3. The light stop block is mounted in such a way that the longitudinal direction of the channels lies in the same direction as the light beam produced by the illuminating device 30, 31 and the middle dividing wall 40 between the two rows of channels is practically at the same height as the peripheral circle 17, as is shown for the light stop block indicated in broken lines in FIG. 2. The result of this arrangement is that light which penetrates below the peripheral circle through the vessel 10 falls upon one or more channels of the lower row (37, 38, 39), while light which passes through the vessel above the peripheral circle falls upon one or more channels of the upper row (34, 35, 36). With the form of embodiment shown, each of the channels also comprises a vertical dividing wall 70 to 75, which subdivides each channel into two narrow channels.

The illuminating device, reading device and electronic evaluating circuit are constructed of conventional components. It lies within the scope of any skilled person to find the most suitable components for a given specific purpose, so that no discussion will be given here on details of the electronic circuit and especially of the construction of the store 60 nor of the control of this store during input and retrieval.

For the following description of the use of the new apparatus, it will be assumed that a vessel 10 has entered a rotational device and is being rotated about its vertical axis 26. As already mentioned, when the vessel enters the rotational device, the switch 65 is actuated, which resets the store 60, that is deletes all stored signals. It will also be assumed that the vessel is rotated in the direction of arrow 80 and that the marking 11" is situated in the position shown in FIG. 4, that is not in the light path between the illuminating device 30, 31 and the reading device 32. The virtually parallel light beam produced by the illuminating device then passes through the vessel wall adjacent to the illuminating device into the vessel and through the vessel wall adjacent to the readin device out of the vessel, reading diffraction of the light beam upon entering the vessel being practically compensated by the diffraction as it immerges from the vessel again. Because the channels of the light stop block 33 are aligned to the direction of the light beam and the direction of the light is scarcely influenced by the vessel, the photoconductors disposed at the rear ends of the channels and thus the associated photodiodes are illuminated relatively uniformly. As already mentioned above, the illuminating of the photodiodes and the electrical signal emitted by these is dependent upon the color of the glass, thickness of vessel wall and optical quality of the vessel wall. It is possible for both the mean value of the illumination and also the temporary deviation from this mean value to undergo relatively large changes, as indicated in FIG. 6 diagrammatically for the periods T1, T3 and T5.

When the vessel 10 has rotated into a position in which a part of the emerging light passes through the marks of the marking, this part of the light is diffracted onto a convergence point or convergence region as a consequence of the lens effect of the marks. When a mark is situated in the light path in front of one of the channels of the light stop block 33, this diffraction has the effect that the light diverging again after the convergence point or region does not fall upon the photoconductor disposed at the rear end of the channel or upon the associated photodiode, but upon the walls of the channel, where it is absorbed. When a mark passes in front of a channel, the illuminating of the associated photodiode is therefore interrupted, and the output signal from the photodiode drops to zero, as indicated in FIG. 6 for the time intervals T2 and T4. In order that light which is only slightly diffracted shall not reach the rearward end of the channel, but instead shall be absorbed by a wall, the width of each channel, in one preferred embodiment of the light stop block, is again subdivided by a central partition 70 to 75. For the evaluation of the electrical signals generated by the photodiodes, it is then only necessary to set a threshold value detector to a predetermined value, for example to the value S indicated by a broken line in FIG. 6, and only to further process those signals which fall below this threshold value. In this way, the signals produced by the marks of the marking are not influenced by the unavoidable fluctuations in the illumination of the photodiodes which occur as light passes through the non-marked vessel walls.

As already mentioned above, the pairs of marks 12, 19 and 15, 24 are provided for activating the reading device 32 and store 60. When the vessel is rotated in the direction indicated by arrow 80, the pair of marks 12 and 19 appear first in front of the channel 34, 37. In accordance with the above explanations, the output signals from the two photodiodes 50, 51 then fall below the threshold value, and the memory store 60 is activated. If the vessel is rotated contrary to arrow 80, then the pair of marks 15 and 24 appears first in front of the channels 36, 39, which causes the store 60 to be activated by the output signals from the two photodiodes 54, 55. The store then remains activated until, when the next vessel enters, the switch 65 is actuated and supplies a restoring signal. This means that all signals produced by the photodiodes 50, 51 or 54, 55 after activation of the store do not have any effect.

As the vessel rotates further, the marks 12, 19 are pushed into the light path in front of the channels 35, 38 respectively, so that the associated photodiode 53 produces a first synchronizing signal, which is conducted to the store 60 and to the counter 61. The store is so adjusted that the code signal associated with the first synchronizing signal is not stored. The counter 61 counts the fist synchronizing signal. When, with further rotation, the mark 20 appears in the light path before the channel 38, the photodiode 53 again produces a synchronizing signal, while the photodiode 52, subject to unchanged illumination, produces no signal. The synchronizing signal is counted in the counter 61 and has the effect in the memory store that the code element zero is stored in the storage cell associated with this second synchronizing signal. As the vessel revolves further, the two marks 13, 21 then appear in front of the channels 35, 38 respectively. The third synchronizing impulse produced by the mark 21 is again counted in the counter 61 and has the effect that the code element 1 produced by the mark 13 is stored in the storage cell associated with the third synchronizing signal.

With the marking system selected as example, when the marks 22 and 14, 23 pass before the channels 35 and 38 of the light stop block, the same operations are initiated as described above for the marks 20 and 13, 21. Because the marking system selected as example contains four code elements, the counter 61 is so adjusted that after the fifth synchronizing signal (the first synchronizing signal from the "start" mark 19 and the four synchronizing impulses produced by the synchronizing marks 20 to 23) it blocks the store input and at the same time conducts the contents of the memory store via the conductor 62 to the one input of the comparator 63.

It will be understood that when markings comprising several tetrads of code elements are used, the counter can be adjusted accordingly.

When vessels having a specific ordinal number are to be sorted out, then this ordinal number is input into the input device 68. The device converts the input ordinal number into the same code as is used for marking the vessels, so that the comparator 63 can compare the two codings. In an embodiment tested in practice, a multiplexer 69 is connected between the input device 68 and comparator 63. This arrangement enables a number of ordinal numbers to be input into the input device and to be stored there, and the ordinal number read off from the vessel to be compared with the several ordinal numbers input into the input device. If the ordinal number read off from the vessel agrees with the ordinal number or one of the ordinal numbers input into the input device, then a signal appears at the output 82 of the comparator. This signal can be used in known manner for rejecting the corresponding vessel out of the sorting line.

In one arrangement, already tested in practice, of the new method of identifying the mold in which a glass vessel has been molded, the marking shown in FIG. 7 is used. This marking comprises two tetrads 85 and 86 for coding the mold number, and the marks 87 and 88 used for generating the start signal are formed identically to the eight timing marks 89. With this marking system also, the eight timing marks 89 are disposed below the circular path 84 and between the two marks 87, 88, provided for triggering the start signal. The code elements of the two tetrads 85 and 86 disposed above the circular path are constituted as vertical extensions of the timing marks 89. As in the marking system already described, each code element shaped as a cylindrical lens corresponds to a binary "1" and the undeformed vessel wall to a binary "0". The vessel number shown as an example in FIG. 7 by the two tetrads 85 and 86, corresponds, when reading from the mark 87 towards the mark 88, to the number 35 in BCD code. Each of the marks used for generating the start signal and each of the timing marks is constructed as a cylindrical lens and projects about 0.35 mm from the vessel wall. These marks have a height of about 3.5 mm. The width of the marks and the spacing between two adjacent marks are about 1.1 mm. The marks of the code elements possess the same cross-section as the timing marks, but their height is only about 2.5 mm.

Figure 8:
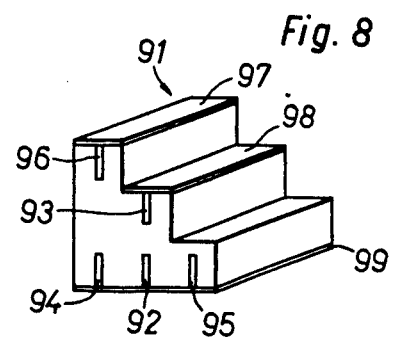
FIG. 8 a light stop block which can be used for reading marking shown in FIG. 7.

The light stop block used for reading the marking described is shown in FIG. 8. This light stop block is shown considerably enlarged by comparison with the marking illustrated in FIG. 7, for clarity of understanding. The light stop block 91 comprises five light stop channels 92 to 96. Channel 92 is provided for the timing marks and channel 93 for the code elements. Because the marks 87, 88 provided for triggering the start signal are not higher than the timing marks, the light stop block possesses, for these marks also, only one channel 94, 95 respectively disposed at the level of channel 92. The fifth channel 96 is disposed at such a height that the light falling upon it is not influenced by the marking. The use of this fifth channel will be described below. The cross-section of the channels is substantially smaller than the cross-section of the individual marks measured in the direction of the incident light. The aim of this is to ensure that the light stop formed by the channel lies as far as possible always in the vicinity of the optical axis of the cylindrical lens formed by the marks. In this way, the diffraction of the light aimed at by the use of the cylindrical lenses is also effectively used when individual cylindrical lenses are displaced relative to their theoretically determined position or possess an inadequate or defective form. A light stop block which can be used for the marks described in the foregoing section possesses, for example, channels having a width of about 0.25 mm, a height of about 1 mm and a length of about 10 mm. These channels are preferably formed as sawtooth slits, the upper and lower open sides of which are covered with thin plates 97, 98 and 99.

Figure 9:
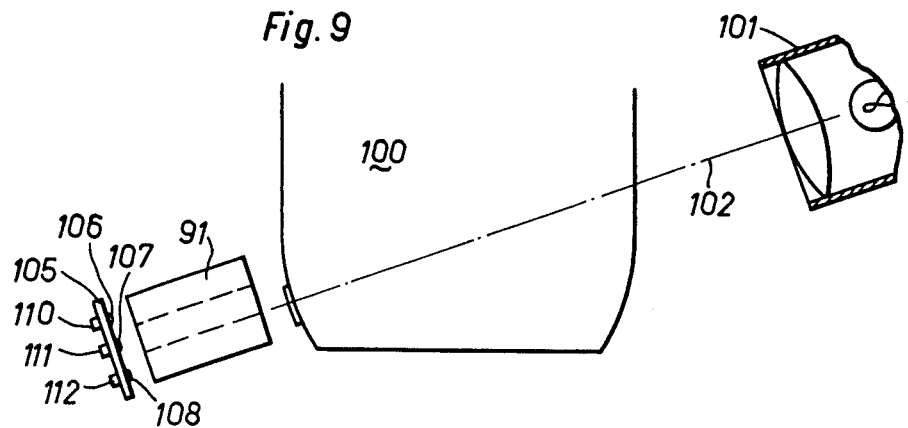
FIG. 9 a lateral view of a light source and of the light stop block of FIG. 8 with associated photodiodes during reading of the marking.

FIG. 9 shows diagrammatically a lateral view of a vessel 100 in the reading position, the illuminating device 101 and the light stop block 91 with associated photodiodes. As already described earlier, the marking is disposed in the region of the bottom turned-in part of the vessel, so that the marks do not get damaged when vessels strike one another. In order that the marks used as optical lenses shall as far as possible be perpendicular to the axis 102 of the light beam, the illuminating device 101 is appropriately inclined. The light stop block 91 has the same inclination, in order that the individual channels shall extend in the direction of the non-diffracted light. On the side of the light stock block remote from the vessel, a support plate 105 is disposed. The distance between light stop block and support plate is about 2 mm. On the support plate small collector lenses are mounted in the direct extensions of the channels of the light stop block; of these, only the lenses 106, 107 and 108 can be seen in FIG. 9, these being associated with the channels 96, 93 and 94. These lenses collect the light arriving through the corresponding channel and conduct it to an associated photodiode 110, 111 and 112 respectively. With this arrangement of the photodiodes in the direct vicinity of the channels of the light stop block, the use of additional photoconductors between channel and photodiode (as described for the embodiment of FIG. 4) is not necessary.

The evaluation circuit connected after the photodiodes corresponds to th circuit the in FIG. 4, with the difference that the gate circuits 57, 58 are not required.

The method of operation of the photodiodes associated with channels 92, 93, 94 and 95 is the same as that for the photodiodes 53, 52, 51 and 55 respectively, as already explained with the help of FIG. 4, so that further description will not be given here.

As already mentioned above, the channel 96 and the photodiode 110 associated with it are so arranged that the light falling upon them is not influenced by the marking. The photodiode 110 is used as an actual value emitter (reading emitter) in a control circuit not shown here, which regulates the voltage to the light source in the illuminating device. The result of this arrangement is that the density of illumination upon the photodiodes remains virtually constant independently of changes in the thickness or color of the vessel wall or of the aging of the light source over long periods of time. Suitable control circuits for this purpose are known to any skilled person, so that a description of same will not be given here.

As practical testing has demonstrated, it is possible for the marking described to be read with the reliability required for industrial purposes from a glass vessel of 60 mm diameter even at the circumferential speed of 3.5 m/sec. which is usual in the stations of a sorting line.

It will be understood that the light stop block and support plate for the photodiodes are incorporated in a light proof housing. In order to prevent excessive heating of the photodiodes and accumulation of dirt in the light stop channels, cool pressurized air can be introduced into the housing, flowing out through the channels. It will also be understood that the illuminating device and the light stop block together with the photodiodes are preferably mounted adjustable in height and pivotal, in order that the device can be utilized for vessels of differing dimensions.

The reliability of reading of the code elements and timing marks of a marking may be adversely affected by the properties of the vessel wall. For instance, steeply domed bottoms of bottles cause deflection of the entire light beam. This total deflection can be greater than the partial deflection caused by the markings, in which case the markings do not produce in the reading device a difference in illumination which can be evaluated. Furthermore, the capability for evaluation of the differences in illumination produced by the marking on the photodiodes of the reading device is dependent upon the transparency of the vessel wall. When light shines through the lateral walls of a vessel, the reliability of reading decreases when the light beam is displaced from the maximum vessel diameter towards the vessel edge. It will also be understood that faults in the vessel wall, for example bubbles or cords, can produce fault signals in the reading device which cannot be distinguished from the signals caused by markings.

The above discussed sources of errors may be avoided by illuminating and reading of the marking in incident light. Reading in incident light enables markings to be read with high reliability, uninfluenced by the transparency of the material of the vessel, by the curvature of the vessel wall carrying the markings and by possible faults in the glass. With this method, it is also not necessary for the light beam which is used for illuminating the vessel wall carrying the markings to be directed towards the axis of the vessel. The improved device can be constructed as simply as the device previously described, but has the advantage that it requires less room than the previous device and can therefore be added on more simply to already existing testing equipment.

Figure 10:
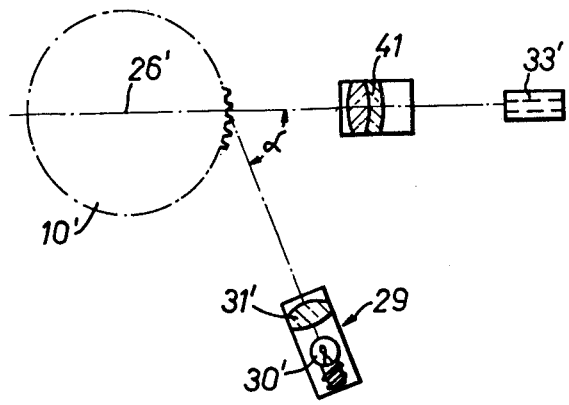
FIG. 10 a diagrammatic plan view of the embodiment intended for reading the markings in incident light.

The device shown diagrammatically in plan in FIG. 10 contains a rotating device not shown for rotating a vessel 10' about its axis of symmetry 26'. Furthermore, an illuminating device 29 is provided, comprising a light source 30' and condenser lens 31'. In this form of embodiment, the illuminating device is so disposed that the emerging light beam is in a plane situated transversely to the axis 26' of rotation and symmetry of the vessel 10'. The illuminating device can be pivoted in this plane and displaced in the direction of the light beam in order to illuminate on the peripheral circle of the vessel on which the marking 11' is disposed a region having a diameter somewhat larger than the height of the two-part marking, in the example described about 12 mm (for a height of about 7 mm for the two-part marking shown in FIG. 3). The illuminating device is also adjustable in height in order to illuminate markings disposed at different levels on the vessel wall. The device further contains a light shielding block 33' into which light conductors are introduced as shown in FIG. 4. Instead of the light conductors photodiodes may be inserted in the light shielding block. In front of the light shielding block 33' a projection optic 41 is disposed, which images the region of the vessel wall illuminated by the light source onto the inlet ends of the light conductors or directly onto the appropriate photodiodes. The optical axes of the projection optic and of the light shielding block lie in the same plane as the illuminating device. The angle $\alpha$ between the optical axes is, in a preferred embodiment, about 70°, as will be described in more detail below.

As any skilled person will readily understand, it is possible without difficulty to arrange the illuminating device and projection optic and also the light shielding block in such a manner that a marking at the mouth of the vessel can be illuminated and imaged in the light shielding block. With an embodiment of this type, the optical axes of the illuminating device and projection optic lie practically on a conical surface.

It is, of course, also possible so to arrange the illuminating device and the projection optic together with the light shielding block that a marking disposed upon the bottom of the vessel is illuminated and imaged in the light shielding block. If the bottom of the vessel is flat, the corresponding optical axes then lie practically on a cylindrical surface.

Figure 11:
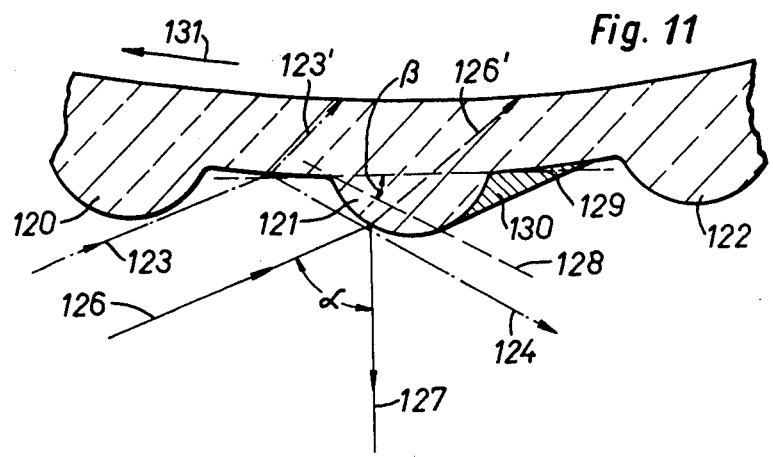
FIG. 11 a diagrammatic view of the light reflected from a code element.

FIG. 11 shows a highly enlarged, horizontal section through a part of a vessel wall and three code elements or timing marks 120, 121, 122 projecting from this wall. As can be clearly seen in this figure, the code elements or timing marks possess a circular arc shaped cross-section which is, however, definitely smaller than a semi-circle. (Practical experience has shown that code elements and timing marks with this flattened type of cross-section are more simple to mold than semi-circular or semi-spherical elements.) The light from the illuminating device falling obliquely onto the vessel wall, the direction of which is, for example, along line 123, is according to known laws to a major portion refracted into the vessel wall (line 123') and to a minor portion reflected in the direction of line 124, without reaching the reading device. The light incident in the same direction, corresponding for example to line 126 and striking one side of code element 121, is also to a major portion refracted in the vessel wall (line 126') and to a minor portion reflected. Depending upon the direction of the tangent line of the reflecting area of the code element this reflected light has the direction for instance of line 127. A chord 128 can be associated with the curvature of the part of the code element towards the incident light, which chord connects together the transition between the vessel wall and code element and the furthest projecting point of the code element. In the example shown, this chord is at an angle $\beta$ of about 35° to the tangent 129 to the vessel wall in the region of the code element 121. Although the incident light is reflected and possibly diffusely reflected or scattered in a plurality of directions on the convex surface of the code element, this reflecting surface may be replaced, to a coarse approximation, by the chord 128 and if, as shown in FIG. 10, the optical axis of the projection optic and of the light shielding block intersects the vessel axis, that is to say it is perpendicular to the tangent 129, then it is to be expected that an optimum quantity of light will be reflected into the reading device if the angle $\alpha$ between the optical axes of the illuminating and reading devices is virtually 70°. Practical experience hitherto has confirmed this argument. The markings can be read with the necessary reliability if the angle between said optical axes lies in the range between 60° and 80°.

As shown in FIG. 11 each illuminated code element does not only act as a reflector but produces a shadow region 130 in the immediate vicinity of the reflecting area. The sharp transition from the reflecting area to the shadow region improves the edge steepness of the read signal and therefore the reliability of the signal detection.

Figure 12:
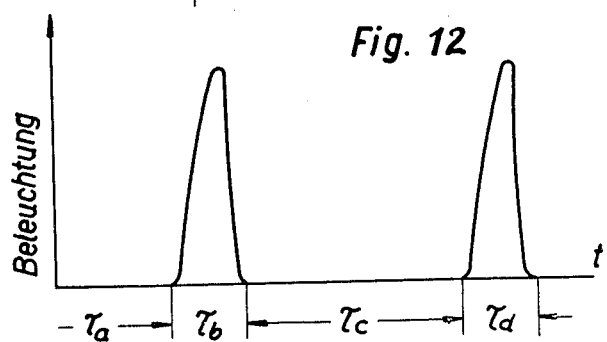
FIG. 12 a corresponding illumination of the associated photodiode.

FIG. 12 shows diagrammatically the illumination of the input surface of a light conductor or a photodiode of the reading device as a vessel is rotated in the direction indicated by arrow 131. During period $T_a$ the vessel wall between code elements 120 and 121 is illuminated. As already described above, the light reflected from the vessel wall does not reach the reading device. On account of the light shielding block 33', which almost completely excludes all unintentional diffusely reflected and scattered light, the illumination of the photodiodes during this period is practically zero. During the subsequent period of time $T_b$ the side of the code element 121 facing toward the incident light is illuminated and light is reflected into the reading device. Because the reflecting surface of the code element does not correspond to the above assumed chord 128 but is a circular arc, the direction of the reflected light lies for only a very short period in the optimum direction along line 127. A brief consideration will show that the illumination of the photodiode with reflected light at first increases slowly and then very rapidly, reaches a maximum value and again falls rapidly off before period $T_b$ has ended. Then, during the passage of the unilluminated side of code element 121 and the vessel wall between the two code elements 121 and 122 there follows a period $T_c$, during which the photodiode is not illuminated. When code element 122 enters the region of the light beam from the illuminating device the same process is repeated during a period $T_d$, as that already described for period $T_b$.

When a marking is read in transmitted (through) light according to FIGS. 4 and 6 the reading device which is illuminated at the at-rest state becomes darkened. When reading a marking in incident light the reading device which is unilluminated in the at-rest state becomes illuminated. As any skilled person will readily understand, the corresponding output signals of the reading device can be reversed by simple electronic means, so that the electronic evaluation of the signals described with reference to FIG. 4 can also be used when reading with incident light.

In accordance with the above considerations and the discussion of the illuminating of the photodiodes with reference to FIG. 12 it will also be understood that a practically rectangular reading signal having a large signal amplitude is obtained if instead of the described code elements having a circular arc cross-section code elements having a practically triangular cross-section are used.

Although in the embodiment as described in connection with FIG. 10 the optical axis of the reading device intersects the axis of rotation of the rotating device, it will be understood that the reading with incident light is also possible if the optical axis of the reading device is laterally offset with respect to the axis of rotation of the rotating device (and of the vessel).

It further will be understood that the described new process may be used with the same advantage if the marked vessels are not rotated but simply advanced in a rectilinear or bent conveyor path in front of the reading device, while the marking is directed towards this reading device. This embodiment of the new method is specially suitable for reading the marking on vessels with rectangular cross-section.

What I claim as new and desire to secure by Letters Patent of the United States is:

1. A method of identifying a mold in which a vessel made from optically transparent material has been molded, said vessel being provided with marks disposed about a path on the wall of the vessel, there being a first set of marks disposed above said path and a second set disposed below said path, one of said first or second set of marks containing code marks and the other set containing timing marks, said method comprising:
    moving said vessel past a light path;
    illuminating said marks by a light path as said vessel is moved and evaluating the incident light reflected by the marks; and
    generating time impulses in response to the evaluation of the timing marks for sequential reading of the code marks.

2. The method of claim 1 wherein the code marks and timing marks are dash-shaped deformations projecting from the vessel wall, disposed transversely to the circular path.

3. The method of claim 1 wherein said vessel includes a third set of marks, said third set including at least one mark disposed ahead of the first and second sets in the direction of movement of the vessel, the method further including illuminating said third set of marks, and generating a signal in response to the sensing of the illumination of said mark to activate the evaluation of the incident light reflected by the first and second set of marks and the reading of the code marks.

4. An apparatus for identifying a mold in which a vessel made from an optically transparent material has been molded, said vessel being provided with marks disposed about a path on the wall of the vessel, there being a first set of marks disposed above said path and a second set of marks being disposed below said path, one of said first or second sets of marks containing code marks and the other set containing timing marks, said apparatus comprising:
    means for illuminating said marks;
    means for moving the vessel past said illuminating means;
    reading means including means for reading the incident light reflected by said code marks and means for reading the incident light reflected by said timing marks and means for converting the increase in illumination caused by the presence of a mark into an electrical signal; and
    means for generating time impulses in response to the reading of incident light reflected by said timing marks for sequential reading of the incident light reflected by said code marks.

5. The apparatus of claim 4 wherein said means for reading said code marks includes at least one photoelement and said means for reading said timing marks includes at least one photoelement.

6. The apparatus of claim 5 wherein the at least one photoelement for reading the code marks and the at least one photoelement for reading the timing marks are disposed one above the other.

7. The apparatus of claim 5 wherein said reading means further includes at least one additional photoelement provided laterally of the prior mentioned photoelements for the purpose of reading an activating signal.

8. The apparatus of claim 5 further including a tubular light stop associated with each photoelement, said light stop permitting passage only of light which is incident virtually parallel to the longitudinal direction and absorbs obliquely incident light.

9. The apparatus of claim 8 wherein the photoelements of the reading device are disposed separately from the associated tubular light stops and further including photoconductor means for conducting the light passing through the light stops to an associated photoelement.

10. Apparatus according to claim 4 characterized in that the illuminating means and reading means are disposed on the same side of the moving vessel.

11. Apparatus according to claim 10 characterized in that the moving means is a rotating device and that the optical axes of the illuminating means and reading means are disposed in the same plane oriented transversely to the rotational axis of the rotating vessel or in conical or cylindrical surfaces disposed symmetrically to the rotational axis.

12. Apparatus according to claim 10 characterized in that the optical axis of the illuminating means intersects the optical axis of the reading means practically in the surface intended for the passage of the marks.

13. Apparatus according to claim 11 characterized in that the angle between the optical axes of the reading means and illuminating means lies in the range between 60° and 80°.

14. The apparatus according to claim 13 wherein said angle is 70°.

* * * * *

UNITED STATES PATENT AND TRADEMARK OFFICE
CERTIFICATE OF CORRECTION

PATENT NO. : 4,201,338
DATED : May 6, 1980
INVENTOR(S) : Rene Keller

It is certified that error appears in the above—identified patent and that said Letters Patent is hereby corrected as shown below:

Column 2, line 16, "severly" should read -- severely --.

Column 6, line 61, "readin" should read -- reading ---.

Column 6, line 61, "reading" should read -- the --.

Column 7, line 65, "fist" should read -- first --.

Column 9, linf 64, "the" first occurrence should read -- shown --.

Column 9, line 64, "th" should read -- the --.

Column 12, line 60, "at" first occurrence should read -- in --.

Signed and Sealed this

Thirtieth Day of September 1980

[SEAL]

Attest:

SIDNEY A. DIAMOND

Attesting Officer

Commissioner of Patents and Trademark